United States Patent
Wu et al.

(10) Patent No.: US 8,524,371 B2
(45) Date of Patent: Sep. 3, 2013

(54) FLUOROPOLYIMIDE INTERMEDIATE TRANSFER MEMBERS

(71) Applicant: Xerox Corporation, Norwalk, CT (US)

(72) Inventors: Jin Wu, Pittsford, NY (US); Yu Qi, Oakville (CA); Nan-Xing Hu, Oakville (CA); Yuhua Tong, Hockessin, DE (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/685,001

(22) Filed: Nov. 26, 2012

(65) Prior Publication Data

US 2013/0084443 A1   Apr. 4, 2013

Related U.S. Application Data

(62) Division of application No. 12/749,545, filed on Mar. 30, 2010, now Pat. No. 8,349,463.

(51) Int. Cl.
*B32B 27/18* (2006.01)
*B32B 27/20* (2006.01)
*B32B 27/26* (2006.01)
*G03G 15/20* (2006.01)

(52) U.S. Cl.
USPC ........ 428/473.5; 399/121; 399/320; 399/328; 399/329; 399/333; 428/215; 428/332; 428/334; 428/349; 428/421; 428/422

(58) Field of Classification Search
USPC ......... 399/121, 320, 328, 329, 333; 428/215, 428/332, 334, 349, 421, 422, 473.5
See application file for complete search history.

(56) References Cited

U.S. PATENT DOCUMENTS

| | | | |
|---|---|---|---|
| 5,487,707 A | 1/1996 | Sharf et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 8,017,248 B2 * | 9/2011 | Qi et al. | 428/473 |
| 2009/0297232 A1 | 12/2009 | Wu | |
| 2010/0028059 A1 | 2/2010 | Wu | |
| 2010/0028700 A1 | 2/2010 | Wu | |
| 2010/0055445 A1 | 3/2010 | Wu | |
| 2010/0055463 A1 | 3/2010 | Wu | |

FOREIGN PATENT DOCUMENTS

JP   2004-251978   *   9/2004

OTHER PUBLICATIONS

Jin Wu et al., U.S. Application No. Not Yet Assigned on Fluoropolyimide Single Layered Intermediate Transfer Members, filed concurrently.
Jin Wu, U.S. Application No. Not Yet Assigned on Cyclo Olefin Polymer Containing Intermediate Transfer Members, filed concurrently.
Jin Wu et al., U.S. Application No. Not Yet Assigned on Silane Acrylate Containing Intermediate Transfer Members, filed concurrently.
Jin Wu, U.S. Appl. No. 12/413,633 on Fluorinated Sulfonic Acid Polymer Grafted Polyaniline Containing Intermediate Transfer Members, filed Mar. 30, 2009.
Jin Wu, U.S. Appl. No. 12/413,638 on Perfluoropolyether Polymer Grafted Polyaniline Containing Intermediate Transfer Members, filed Mar. 30, 2009.
Jin Wu, U.S. Appl. No. 12/413,642 on Fluorotelomer Grafted Polyaniline Containing Intermediate Transfer Members, filed Mar. 30, 2009.
Jin Wu, U.S. Appl. No. 12/413,651 on Polyimide Polysiloxane Intermediate Transfer Members, filed Mar. 30, 2009.
Jin Wu et al., U.S. Appl. No. 12/413,783 on Glycoluril Resin and Polyol Resin Members, filed Mar. 30, 2009.
Jin Wu et al., U.S. Appl. No. 12/413,795 on Glycoluril Resin and Polyol Resin Dual Members, filed Mar. 30, 2009.
Jin Wu, U.S. Appl. No. 12/413,832 on Polyaniline Dialkylsulfate Complexes Containing Intermediate Transfer Members, filed Mar. 30, 2009.

* cited by examiner

*Primary Examiner* — Ana Woodward
(74) *Attorney, Agent, or Firm* — Eugene O. Palazzo

(57) ABSTRACT

An intermediate transfer media, such as a belt, that includes a first optional polyimide substrate layer, and a second layer of a fluoropolyimide polymer.

13 Claims, No Drawings

FLUOROPOLYIMIDE INTERMEDIATE TRANSFER MEMBERS

CROSS REFERENCE TO RELATED APPLICATIONS

This application is a divisional of pending U.S. application Ser. No. 12/749,545, filed Mar. 30, 2010 by the same inventors, the disclosure of the aforementioned pending application being totally incorporated herein by reference.

U.S. application Ser. No. 12/749,539, now U.S. Pat. No. 8,293,369, entitled Fluoropolyimide Single Layered Intermediate Transfer Members, the disclosure of which is totally incorporated herein by reference, illustrates an intermediate transfer member comprised of a fluoropolyimide.

U.S. application Ser. No. 12/749,547, now U.S. Pat. No. 8,062,752, entitled Cyclo Olefin Polymer Containing Intermediate Transfer Members, the disclosure of which is totally incorporated herein by reference, illustrates an intermediate transfer member comprised of a cyclo olefin polymer.

Copending U.S. application Ser. No. 12/749,548, filed Mar. 30, 2010, U.S. Publication 20110244203, entitled Silane Acrylate Containing Intermediate Transfer Members, the disclosure of which is totally incorporated herein by reference, illustrates an intermediate transfer member comprised of an optional supporting substrate, and in the form of a layer a mixture of a carbon nanotube, a photoinitiator, and a hybrid component formed by the reaction of a bisphenol and a silane acrylate.

Copending U.S. application Ser. No. 12/413,633, filed Mar. 30, 2009, U.S. Publication No. 20100249322, entitled Fluorinated Sulfonic Acid Polymer Grafted Polyaniline Containing Intermediate Transfer Members, the disclosure of which is totally incorporated herein by reference, illustrates an intermediate transfer member comprised of a substrate, and in contact therewith a polyaniline having grafted thereto a fluorinated sulfonic acid polymer.

U.S. application Ser. No. 12/413,638, filed Mar. 30, 2009, now U.S. Pat. No. 8,197,937, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

U.S. application Ser. No. 12/413,642, filed Mar. 30, 2009, now U.S. Pat. No. 8,129,025, entitled Fluorotelomer Grafted Polyaniline Containing Intermediate Transfer Members, the disclosure of which is totally incorporated herein by reference, illustrates An intermediate transfer member comprised of a substrate, and a layer comprised of polyaniline having grafted thereto a fluorotelomer.

U.S. application Ser. No. 12/413,651, filed Mar. 30, 2009, now U.S. Pat. No. 8,153,213, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

U.S. application Ser. No. 12/413,783, filed Mar. 30, 2009, now U.S. Pat. No. 8,084,110, entitled Glycoluril Resin And Polyol Resin Members, the disclosure of which is totally incorporated herein by reference, illustrates a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a resin mixture of a glycoluril resin and a polyol resin.

U.S. application Ser. No. 12/413,795, filed Mar. 30, 2009, now U.S. Pat. No. 8,105,670, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin.

U.S. application Ser. No. 12/413,832, filed Mar. 30, 2009, now U.S. Pat. No. 8,084,111, entitled Polyaniline Dialkylsulfate Complexes Containing Intermediate Transfer Members, the disclosure of which is totally incorporated herein by reference, illustrates an intermediate transfer member comprised of a polyaniline dialkylsulfate complex.

Illustrated in U.S. application Ser. No. 12/200,074, U.S. Publication No. 20100055463, entitled Hydrophobic Carbon Black Intermediate Transfer Components, filed Aug. 28, 2008, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/200,111, U.S. Publication No. 20100055445, filed Aug. 28, 2008, is an intermediate transfer member comprised of a substrate comprising a polyetherimide polysiloxane copolymer.

Illustrated in U.S. application Ser. No. 12/129,995, U.S. Publication No. 20090297232, filed May 30, 2008, now U.S. Pat. No. 8,005,410, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of for example, from about 175° C. to about 290° C. over a period of time of from about 10 minutes to about 120 minutes.

Illustrated in U.S. application Ser. No. 12/181,354, U.S. Publication No. 20100028700, filed Jul. 29, 2008, now U.S. Pat. No. 7,985,464, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, U.S. Publication No. 20100028059, filed Jul. 29, 2008, now U.S. Pat. No. 7,738,824, entitled Treated Carbon Black Intermediate Transfer Components, the disclosure of which is totally incorporated herein by reference, is an intermediate transfer members comprised of a substrate comprising a poly (vinylalkoxysilane) surface treated carbon black.

BACKGROUND

Disclosed are intermediate transfer members, and more specifically, intermediate transfer members that can be selected for a number of known devices, such as a xerographic apparatus, that involves transferring a developed image in an electrostatographic, for example xerographic, including digital, image on image, and the like, machines or apparatuses, and printers. In embodiments, there are selected intermediate transfer members comprised of a fluoropolyimide and intermediate transfer members comprised of a first supporting substrate layer, such as a polyimide layer and a second layer thereover or thereunder, and more specifically, where the fluoropolyimide layer is in full contact with the polyimide layer, and where there can be included in at least one of the first and second layers a conductive component.

A number of advantages are associated with the intermediate transfer members of the present disclosure, such as improved toner transfer efficiency and excellent dimensional stability, due primarily to the water expelling characteristics of the fluoropolyimide when compared to polyimide intermediate transfer members that are free of a fluoropolyimide; excellent mechanical characteristics, robustness, consistent, and excellent surface resistivities, and acceptable adhesion properties, especially when there is included in the intermediate transfer member an adhesive layer; excellent maintained conductivity or resistivity for extended time periods; dimensional stability; ITB humidity insensitivity for extended time periods; excellent dispersability in a polymeric solution; low and acceptable surface friction characteristics; and minimum or substantially no peeling or separation of the layers.

One specific advantage of the disclosed two-layer ITB is its low surface energy, for example, a water contact angle of from about 100° to about 150° (degrees), which advantage is of value with regard to improved toner transfer and cleaning, where in embodiments the top layer functions primarily to obtain high fidelity transfer in view of its low surface energy, while the base polyimide layer provides reliable mechanical strength.

In aspects thereof, the present disclosure relates to a multilayer intermediate transfer layer, such as a belt (ITB) comprised of a single layer of a fluoropolyimide or a multilayer intermediate transfer member comprised, for example, of a polyimide base layer and a fluoropolyimide top layer, and where each layer further includes a conductive component, and an optional adhesive layer situated between the two layers, and which layered member can be prepared by known solution casting methods, and known extrusion molded processes with the optional adhesive layer can be generated, and applied by known spray coating and flow coating processes.

Furthermore, disclosed herein is a hydrophobic intermediate transfer member having a surface resistivity of from about $10^7$ to about $10^{14}$ ohm/sq, or from about $10^9$ to about $10^{12}$ ohm/sq, and a bulk resistivity of from about $10^7$ to about $10^{14}$ ohm cm, or from about $10^9$ to about $10^{12}$ ohm cm.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors, and using one or more transfer stations; and increasing the number of substrates that can be selected. However, a disadvantage of using an intermediate transfer member is that a plurality of transfer operations is usually needed allowing for the possibility of charge exchange occurring between toner particles, and the transfer member which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of a fluorinated carbon filler in a polyimide intermediate transfer member layer. However, there can be problems associated with the use of such fillers in that undissolved particles frequently bloom or migrate to the surface of the fluorinated polymer, and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye, resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to about 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member with a number of the advantages illustrated herein, such as excellent mechanical, and humidity insensitivity characteristics, permitting high copy quality where developed images with minimal resolution issues can be obtained. It is also desired to provide a weldable intermediate transfer belt that may not, but could, have puzzle cut seams, and instead has a weldable seam thereby providing a belt that can be manufactured without labor intensive steps, such as manually piecing together the puzzle cut seam with fingers, and without the lengthy high temperature and high humidity conditioning steps.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an intermediate transfer member comprised of a polyimide substrate, and thereover a fluoropolyimide; a transfer media comprised of a polyimide first supporting substrate layer, and thereover a second layer comprised of a fluoropolyimide; an adhesive layer situated between the first layer and the second layer, and wherein at least one of the first layer and the second layer further contain a conductive component; an intermediate transfer belt comprised of a polyimide substrate layer, and thereover a layer comprised of a fluoropolyimide; optionally wherein at least one of the substrate layer and the fluoropolyimide layer further contains a conductive component, and wherein the fluoropolyimide is represented by

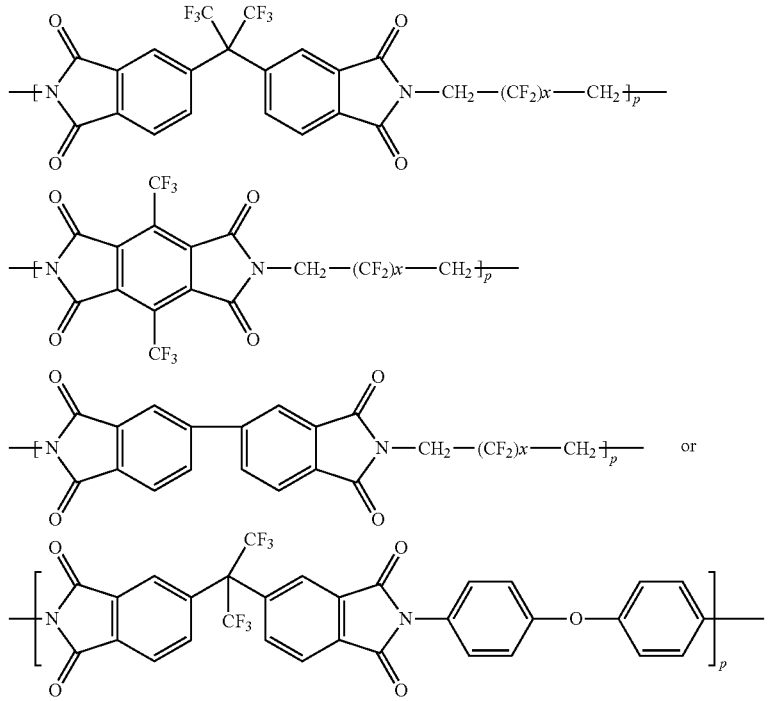

wherein x represents the number of repeating groups and is, for example, a number of from about 1 to about 100; p represents the number of repeating units ranging, for example, from about 10 to about 1,000; the substrate is of a thickness of from about 50 to about 125 microns, and the fluoropolyimide in the form of a layer is of a thickness of from about 5 to about 40 microns, and the fluoropolyimide possesses a weight average molecular weight of from about 100,000 to about 400,000; an intermediate transfer member comprised of a polyimide substrate, and thereover a fluoropolyimide layer; a transfer media comprised of a polyimide first supporting substrate layer, and thereover a second layer comprised of a fluoropolyimide, an adhesive layer situated between the first layer and the second layer, and wherein at least one of the first layer and the second layer further contain a known conductive component like carbon black, a polyaniline, a metal oxide, and the like; an intermediate transfer belt comprised of a polyimide substrate layer, and thereover a layer comprised of a fluoropolyimide; and wherein at least one of the substrate layer and the fluoropolyimide layer further contains a conductive component, wherein the substrate is of a thickness of from about 30 to about 300 microns, and the fluoropolyimide in the form of a layer is of a thickness of from about 1 to about 150 microns, and the fluoropolyimide possesses a weight average molecular weight as determined by known methods, such as GPC, of from about 5,000 to about 1,000,000, from about 20,000 to about 750,000, from about 50,000 to about 400,000, and the like; an intermediate transfer member, such as an intermediate belt, comprised of a substrate comprising, for example, a polyimide, and thereover a layer comprised of a fluoropolyimide; and an intermediate transfer member comprised primarily of a fluoropolyimide.

Furthermore, there is disclosed an intermediate transfer member comprised of a fluoropolyimide or polyimide supporting substrate, a fluoropolyimide layer thereover, and where each layer contains a conductive component such as a polyaniline, a carbon black, a metal oxide, and the like; an apparatus for forming images on a recording medium comprising a charge retentive surface to receive an electrostatic latent image thereon; a development component to apply toner to the charge retentive surface, such as a photoconductor, to develop the electrostatic latent image, and to form a developed image on the charge retentive surface; and an intermediate transfer media that functions to transfer the developed image from the charge retentive surface to a substrate, wherein the intermediate transfer media is comprised of a fluoropolyimide or a polyimide substrate, and in contact with the substrate a fluoropolyimide surface layer.

In addition, the present disclosure provides, in embodiments, an apparatus for forming images on a recording medium comprising a photoconductor surface with an electrostatic latent image thereon; a development source to apply toner to the photoconductor, and to develop the electrostatic latent image, followed by transfer of the developed image to a substrate like paper or other suitable material like plastic, followed by fixing the developed image to the substrate, which fixing can be accomplished by heat.

Fluoropolyimide Examples

The fluoropolyimide selected for the intermediate transfer members of the present disclosure can be prepared by known reactions, such as the polycondensation between an aromatic dianhydride and a diamine. By properly tailoring the fluoropolyimide structure, the resulting fluoropolyimide can possess a number of the characteristics illustrated herein. For example, fluoropolyimides containing both a rigid aromatic imide functionality, and fluorinated aliphatic structure permit intermediate transfer members (ITM) with excellent mechanical properties, such as toughness and flexibility, and low surface energy characteristics such as having a water contact angle of greater than 80°, or greater than 100°, such as from 90 to about 135 degrees.

Tailoring the fluoropolyimide polymer structures/formulas can be achieved by reacting a selected dianhydride with a diamine monomer as illustrated below

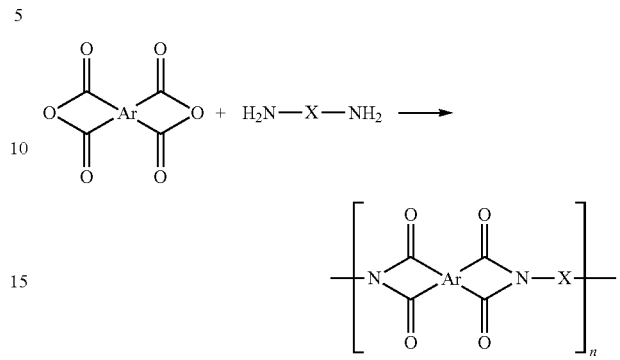

wherein x is a fluorinated aliphatic group, an alkylene, an aryl, or mixtures thereof; Ar is aryl line phenyl; n represents the number of repeating segment and is, for example, a number of from about 20 to about 1,000, from about 30 to about 800, or from about 50 to about 500.

Examples of diamines ($H_2N$—X—$NH_2$) selected as a reactant to form the fluoropolyimide comprises a X group, which can be $R_1$ or $R_2$, and wherein $R_1$ comprises a fluorinated aliphatic group, such as vinylidene fluoride, tetrafluoroethylene, hexafluoropropylene, perfluoro(methyl vinyl ether), perfluoro(ethyl vinyl ether), perfluoro(propyl vinyl ether), and mixtures thereof; $R_2$ comprises alkyl or aryl groups, such as $C_xH_{2x}$— (x is an integer of from about 1 to about 15, or an integer of from about 2 to about 10), and aryl or Ar of —$CH_2$—$C_6H_4$—, —$C_6H_4$—$C_6H_4$—, —$C_6H_4$—O—$C_6H_4$—, —$C_6H_4$—S—$C_6H_4$—, —$C_6H_4$—CO—$C_6H_4$—, or —$C_6H_4$—$SO_2$—$C_6H_4$—, and combinations thereof.

Examples of dianhydrides

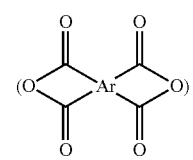

selected as a reactant to form the fluoropolyimide include

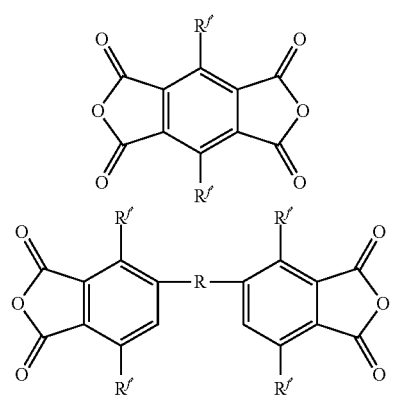

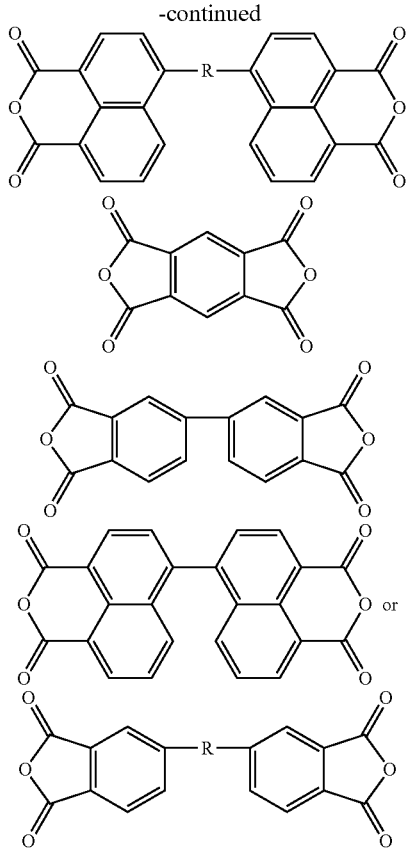

wherein Rf in the above anhydrides represents fluorine, a fluorinated alkyl group, for example —CF$_3$, —CF$_2$(CF$_2$)$_m$CF$_3$, or —(CF$_2$CF$_2$O)$_m$CF$_3$, wherein m is a number of, for example, from about 0 to about 100, from about 1 to about 50, or from about 1 to about 20; R is a linkage group, such as, for example, a hexafluoromethylisopropylidene group

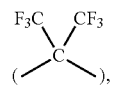

a thio group (—S—), an oxy group (—O—), an isocyano group (—N=CH—O—), a carbonyl group

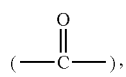

a sulphonyl group

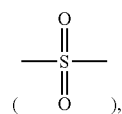

a urethane group, and combinations thereof.

In embodiments, the fluorinated polyimide may have the following formulas

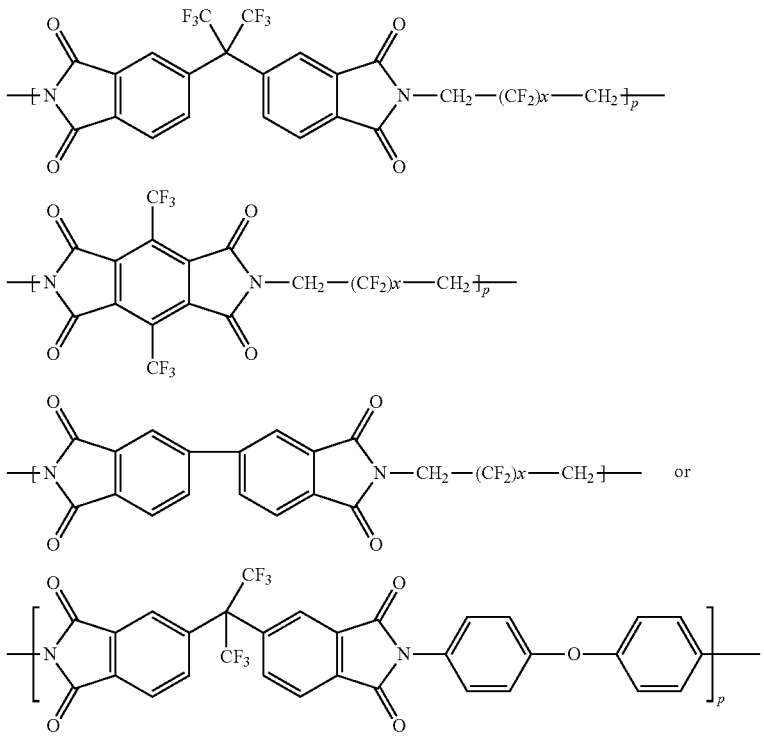

wherein x is, for example, a number of from about 1 to about 100, from about 2 to about 50, or from 1 to about 8; p is the number of repeating units of, for example, from about 10 to about 1,000, from about 20 to about 500, from about 20 to about 700, or from about 75 to about 300.

Examples of specific selected first or supporting layer thermoplastic polyimides are KAPTON® KJ, commercially available from E.I. DuPont, Wilmington, Del., as represented by

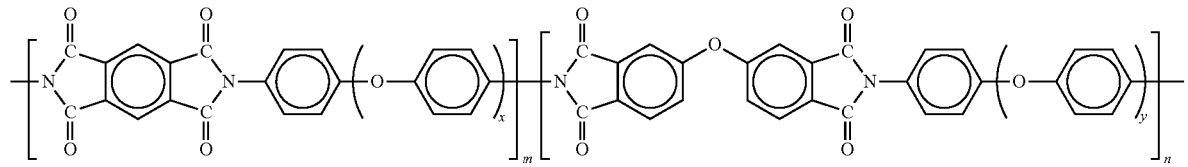

wherein x is equal to 2; y is equal to 2; m and n are from about 10 to about 300; and IMIDEX®, commercially available from West Lake Plastic Company, as represented by

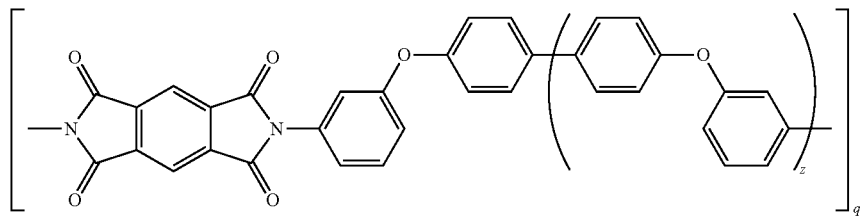

wherein z is equal to 1, and q is from about 10 to about 300.

A number of the thermosetting polyimides selected as the first supporting layer, in embodiments, illustrated, for example, in the appropriate copending applications recited herein can be cured at suitable temperatures, and more specifically, from about 180° C. to about 260° C. over a short period of time, such as, for example, from about 10 to about 120 minutes, and from about 20 to about 60 minutes; possess, for example, a number average molecular weight of from about 5,000 to about 500,000, or from about 10,000 to about 100,000, and a weight average molecular weight of from about 50,000 to about 5,000,000, or from about 100,000 to about 1,000,000; thermosetting polyimide precursors that are cured at higher temperatures (above 300° C.) than the VTEC™ PI polyimide precursors, and which precursors include, for example, PYRE-M.L® RC-5019, RC-5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, commercially available from E.I. DuPont, Wilmington, Del., in amounts of, for example, from about 70 to about 97, or from about 80 to about 95 weight percent of the intermediate transfer member.

Also, suitable supporting substrate polyimides include those formed from various diamines and dianhydrides, such as polyamideimide, polyetherimide, polysiloxane polyetherimide block copolymer, and the like. Preferred polyimides include aromatic polyimides, such as those formed by the reacting pyromellitic acid and diaminodiphenylether, or by imidization of copolymeric acids, such as biphenyltetracarboxylic acid and pyromellitic acid, with two aromatic diamines, such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Other suitable aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

In embodiments, the polyamideimide supporting substrate can be synthesized by at least the following two methods (1) isocyanate method which involves the reaction between isocyanate and trimellitic anhydride; or (2) acid chloride method where there is reacted a diamine and trimellitic anhydride chloride. Examples of the polyamideimides include VYLOMAX® HR-11NN (15 weight percent solution in N methylpyrrolidone, Tg=300° C., and $M_w$=45,000); HR-12N2 (30 weight percent solution in N-methylpyrrolidone/xylene/methyl ethyl ketone=50/35/15, Tg=255° C., and $M_w$=8,000); HR-13NX (30 weight percent solution in N-methylpyrrolidone/xylene=67/33, Tg=280° C., and $M_w$=10,000); HR-15ET (25 weight percent solution in ethanol/toluene=50/50, Tg=260° C., and $M_w$=10,000); HR-16NN (14 weight percent solution in N-methylpyrrolidone, Tg=320° C., and $M_w$=100,000), all commercially available from Toyobo Company of Japan; and TORLON® AI-10 (Tg=272° C.), commercially available from Solvay Advanced Polymers, LLC, Alpharetta, Ga.

Examples of polyetherimide supporting substrates are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

The conductive material, such as a carbon black, a metal oxide or polyaniline, is, in embodiments, present in at least one layer of the intermediate transfer member in, for example, an amount of from about 1 to about 50 weight percent, from about 3 to about 40 weight percent, or more specifically, from about 5 to about 30 weight percent.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher surface area and the higher structure, the more conductive the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers).

Further examples of carbon blacks selected as the conductive component include Channel carbon blacks available from Evonik-Degussa. Specific examples of Channel conductive carbon blacks are Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

As illustrated herein, the carbon black is usually formed into a dispersion, such as a blend of the fluoropolyimide, and a blend of the polyimide. With proper milling processes, uniform dispersions can be obtained, and then coated on glass plates using a draw bar coating method. The resulting individual films can be dried at high temperatures, such as from about 100° C. to about 400° C., for a suitable period of time, such as from about 20 to about 180 minutes, while remaining on the separate glass plates. After drying and cooling to room temperature, about 23° C. to about 25° C., the films on the glass plates can be immersed into water overnight, about 18 to 23 hours, and subsequently the 50 to 150 micron thick films can be released from the glass to form a functional intermediate transfer member.

In embodiments, the polyaniline component has a relatively small particle size of from about 0.5 to about 5 microns, from about 1.1 to about 2.3 microns, from about 1.2 to about 2 microns, from about 1.5 to about 1.9 microns, or about 1.7 microns. Specific examples of polyanilines selected for the transfer member, such as an ITB, are PANIPOL™ F, commercially available from Panipol Oy, Finland.

The conductive components can also be included in the fluoropolyimide single layer intermediate transfer member, in the amounts illustrated herein.

Adhesive layer component examples, and which layer is usually situated between the supporting substrate and the top fluoropolyimide thereover, are a number of epoxy, urethane, silicone, polyester, and the like. Generally, the adhesive layer is a solventless layer that is materials that are liquid at room temperature (about 25° C.) and are able to crosslink to an elastic or rigid film to adhere at least two materials together. Specific examples include 100 percent solids adhesives including polyurethane adhesives from Lord Corporation, Erie, Pa., such as TYCEL® 7924 (viscosity from about 1,400 to about 2,000 cps), TYCEL® 7975 (viscosity from about 1,200 to about 1,600 cps), and TYCEL® 7276. The viscosity range of the adhesives is from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than 100 nanometers, and more specifically, as illustrated hereinafter.

The thickness of each layer of the intermediate transfer member can vary, and is not limited to any specific value. In specific embodiments, the substrate layer thickness is, for example, from about 20 to about 300 microns, from about 30 to about 200 microns, from about 75 to about 150 microns, from about 50 to about 100 microns, while the thickness of the top fluoropolyimide is, for example, from about 1 to about 150 microns, from about 2 to about 100 microns, from about 3 to about 70 microns, and from about 10 to about 50 microns. The adhesive layer thickness is, for example, from about 1 to about 100 nanometers, from about 5 to about 75 nanometers, or from about 50 to about 100 nanometers.

When the supporting substrate is not present, the fluoropolyimide layer is, for example, of a thickness of from about 10 to about 300 microns, from about 30 to about 200 microns, from about 40 to about 150 microns, and from about 50 to about 100 microns.

The disclosed intermediate transfer members are, in embodiments, weldable, that is the seam of the member like a belt is weldable, and more specifically, may be ultrasonically welded to produce a seam. The surface resistivity of the disclosed intermediate transfer member is, for example, from about $10^8$ to about $10^{14}$ ohm/sq, or from about $10^9$ to about $10^{12}$ ohm/sq. The sheet resistivity of the intermediate transfer weldable member is, for example, from about $10^7$ to about $10^{13}$ ohm cm, or from about $10^8$ to about $10^{12}$ ohm cm.

The intermediate transfer members illustrated herein like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer or it can be comprised of several layers, such as from about 2 to about 5 layers. In embodiments, the intermediate transfer member further includes an outer release layer.

Release layer examples situated on and in contact with the second fluoropolyimide layer, or for the single layer fluoropolyimide members include low surface energy materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers such as those sold as VITON® such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®, (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1,3-bromoperfluoropropene-1, 1,1-dihydro-3-bromoperfluoropropene-1, or any other suitable known commercially available cure site monomer.

The layer or layers may be deposited on the substrate by known coating processes. Known methods for forming the outer layer(s) on the substrate film, such as dipping, spraying, such as by multiple spray applications of very thin films, casting, flow-coating, web-coating, roll-coating, extrusion, molding, or the like, can be used. In embodiments, the deposition of the layers can be achieved by spraying such as by multiple spray applications of very thin films, casting, by web coating, by flow-coating, and most preferably by laminating.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

Throughout the disclosure and claims, the phrase "from about to about" includes all values therebetween, thus from about 1 to about 50 includes all numbers in between 1 and 50 like 1 to 10, 10 to 20, 20 to 30, 30 to 40, and 40 to 50, and more specifically, for example, 1 to 10 includes at least 1, 2, 3, 4, 5, 6, 7, 8, 9, and 10.

Specific embodiments will now be described in detail. These examples are intended to be illustrative, and are not limited to the materials, conditions, or process parameters set forth in these embodiments. All parts are percentages by weight of total solids unless otherwise indicated.

Synthetic Example I

The fluoropolyimide (FPI-1) of the following structure

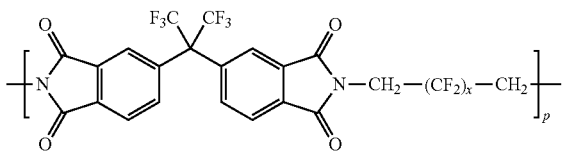

where p is 600; x is 10, and n is 200, was synthesized in accordance with the following reaction scheme in the presence of heat

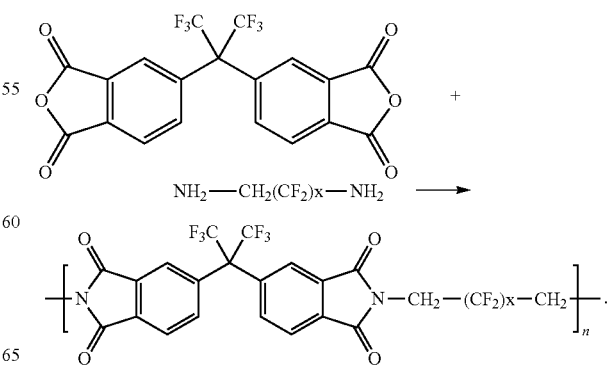

The final structure was determined by NMR and the weight average molecular weight was about 100,000 as determined by GPC analysis.

The dianhydride and the diamine monomers were polymerized in m-cresol at a relatively high temperature (200° C.) with a small amount, about 1 weight percent, of isoquinoline as the catalyst. The resulting polymer solution was precipitated in methanol. The resulting fluoropolyimide polymer product was washed in methanol twice by dissolving and precipitation, and dried at 100° C. for 12 hours.

Synthetic Example II

The fluoropolyimide (FPI-2) of the following structure

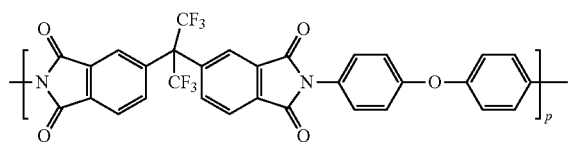

was prepared in accordance with the following reaction scheme

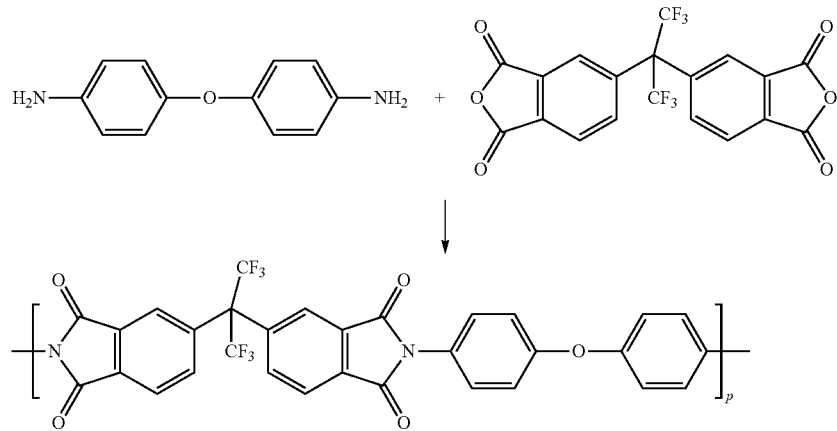

and where the value of p was 500.

The dianhydride and the diamine monomers were polymerized in m-cresol at a relatively high temperature (200° C.) with a small amount, 1 weight percent, of isoquinoline as the catalyst. The resulting polymer solution was precipitated in methanol. The polymer was washed in methanol twice by dissolving and precipitation, and dried at 100° C. for 12 hours. The weight average molecular weight of the fluoropolyimide (FPI-2) was measured using GPC, and was about 360,000.

Comparative Example 1

A one-layer polyimide intermediate transfer belt (ITB) member was prepared as follows.

One gram of Color Black FW1 (B.E.T. surface area of 320 m$^2$/g, DBP absorption of 2.89 ml/g, primary particle diameter of 13 nanometers), as obtained from Evonik-Degussa, was mixed with 57.5 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate.

After drying and cooling for about 3 hours to room temperature, about 23° C. to about 25° C., the film on the glass plate was immersed into water overnight, about 23 hours, and an 80 micron thick freestanding film was released from the glass automatically resulting in an intermediate transfer member comprised of the above polyimide/carbon black with a ratio by weight of 92/8.

Example I

A one-layer fluoropolyimide intermediate transfer belt (ITB) member was prepared as follows.

One gram of Color Black FW1 (B.E.T. surface area of 320 m$^2$/g, DBP absorption of 2.89 ml/g, primary particle diameter of 13 nanometers), as obtained from Evonik-Degussa, was mixed with 11.5 grams of the fluoropolyimide (FPI-2) (Synthetic Example II) in 60 grams of N,N'-dimethylacetamide (DMAc). By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 160° C. for 20 minutes while remaining on the glass plate.

After drying and cooling for about 3 hours to room temperature, the film on the glass plate was immersed into water overnight, about 23 hours, and an 80 micron thick freestanding film was released from the glass automatically resulting in an intermediate transfer member comprised of the above fluoropolyimide/carbon black with a ratio by weight of 92/8.

Example II

A one-layer fluoropolyimide/polyimide blend intermediate transfer belt (ITB) member is prepared as follows.

One gram of Color Black FW1 (B.E.T. surface area of 320 m$^2$/g, DBP absorption of 2.89 ml/g, primary particle diameter of 13 nanometers), as obtained from Evonik-Degussa, is mixed with 3.5 grams of the fluoropolyimide (FPI-1) (Synthetic Example I), and 40 grams of a polyamic acid (polyimide precursor) solution, VTEC™ PI 1388 (20 weight percent solution in N-methylpyrrolidone, $T_g$>320° C.), as obtained from Richard Blaine International, Incorporated, in 40 grams of N-methylpyrrolidone. By ball milling this mixture with 2 millimeter stainless shot with an Attritor for 1 hour, a uniform dispersion is obtained. The resulting dispersion is then coated on a glass plate using a draw bar coating method. Subsequently, the film obtained is dried at 160° C. for 20 minutes while remaining on the glass plate.

After drying and cooling for about 3 hours to room temperature, about 23° C. to about 25° C., the film on the glass plate is immersed into water overnight, about 23 hours, and an 80 micron thick freestanding film was released from the glass automatically resulting in an intermediate transfer member comprised of the above fluoropolyimide/polyimide/carbon black with a ratio by weight of 28/64/8.

Example III

A two-layer intermediate transfer belt (ITB) member with a polyimide base layer and a fluoropolyimide top layer was prepared as follows.

One gram of Color Black FW1 (B.E.T. surface area of 320 $m^2$/g, DBP absorption of 2.89 ml/g, primary particle diameter of 13 nanometers), as obtained from Evonik-Degussa, was mixed with 57.5 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion was obtained. The resulting dispersion was then coated on a glass plate using a draw bar coating method. Subsequently, the film obtained was dried at 100° C. for 20 minutes, and then at 200° C. for an additional 60 minutes while remaining on the glass plate.

One gram of Color Black FW1 (B.E.T. surface area of 320 $m^2$/g, DBP absorption of 2.89 ml/g, primary particle diameter of 13 nanometers), as obtained from Evonik-Degussa, was mixed with 11.5 grams of the fluoropolyimide (FPI-2) (Synthetic Example II) in 60 grams of N,N'-dimethylacetamide (DMAc). By ball milling this mixture with 2 millimeter stainless shot with an Attritor for 1 hour, a uniform dispersion was obtained. The resulting dispersion was then coated on the above polyimide base layer using a draw bar coating method. Subsequently, the two-layer film obtained was dried at 160° C. for 20 minutes while remaining on the glass plate.

The resulting two-layer film on the glass was then immersed into water overnight, about 23 hours, and the freestanding film was released from the glass resulting in a two-layer intermediate transfer member with an 80 micron thick polyimide/carbon black with a ratio of 92/8, base supporting layer, and a 20 micron thick fluoropolyimide/carbon black with a ratio of 92/8, top layer.

Example IV

A two-layer intermediate transfer belt (ITB) member with a polyimide base layer, and the fluoropolyimide/polyimide blend top layer is prepared as follows.

One gram of Color Black FW1 (B.E.T. surface area of 320 $m^2$/g, DBP absorption of 2.89 ml/g, primary particle diameter of 13 nanometers), as obtained from Evonik-Degussa, is mixed with 57.5 grams of a polyamic acid (polyimide precursor) solution, VTEC™ PI 1388 (20 weight percent solution in N-methylpyrrolidone, $T_g$>320° C.), as obtained from Richard Blaine International, Incorporated. By ball milling this mixture with 2 millimeter stainless shot with an Attritor for 1 hour, a uniform dispersion is obtained. The resulting dispersion is then coated on a glass plate using a draw bar coating method. Subsequently, the film obtained is dried at 100° C. for 20 minutes, and then at 200° C. for an additional 60 minutes while remaining on the glass plate.

One gram of Color Black FW1 (B.E.T. surface area of 320 $m^2$/g, DBP absorption of 2.89 ml/g, primary particle diameter of 13 nanometers), as obtained from Evonik-Degussa, is mixed with 3.5 grams of the fluoropolyimide (FPI-1) (Synthetic Example I), and 40 grams of a polyamic acid (polyimide precursor) solution, VTEC™ PI 1388 (20 weight percent solution in N-methylpyrrolidone, $T_g$>320° C.), as obtained from Richard Blaine International, Incorporated, in 40 grams of N-methylpyrrolidone. By ball milling this mixture with 2 millimeter stainless shot with an Attritor for 1 hour, a uniform dispersion is obtained. The resulting dispersion is then coated on the above polyimide base layer using a draw bar coating method. Subsequently, the film obtained is dried at 160° C. for 20 minutes while remaining on the glass plate.

The resulting two-layer film on the glass is then immersed into water overnight, about 23 hours, and the freestanding film is released from the glass resulting in a two-layer intermediate transfer member with an 80 micron thick polyimide/carbon black, of a ratio of 92/8, base supporting layer, and a 20 micron thick fluoropolyimide/polyimide/carbon black with a ratio of 28/64/8, top layer.

Example V

A three-layer intermediate transfer belt (ITB) member with a polyimide base layer, a solventless adhesive layer, and a fluoropolyimide top layer is prepared by repeating the process of Example III except that a solventless adhesive layer is incorporated between the polyimide base layer and the fluoropolyimide top layer.

The solventless adhesive, TYCEL® 7975-A (adhesive) and 7276 (curing agent), both obtained from Lord Corporation, Erie, Pa., is applied on the supporting base layer via spray coating, and then the top layer is coated as described in Example III.

The resulting three-layer film on the glass substrate is then immersed into water overnight, about 23 hours, and the freestanding film is released from the glass automatically resulting in a three-layer intermediate transfer member with an 80 micron thick polyimide/carbon black base layer with a ratio by weight of 92/8; a 100 nanometer thick adhesive layer thereover; and a 20 micron thick fluoropolyimide/carbon black top layer with a ratio by weight of 92/8.

Surface Resistivity Measurement

The above ITB members or devices of Comparative Example 1 and Example I were measured for surface resistivity (averaging four to six measurements at varying spots, 72° F./65 percent room humidity) using a High Resistivity Meter (Hiresta-Up MCP-HT450 from Mitsubishi Chemical Corp.), and the surface resistivity results are illustrated in Table 1 below.

TABLE 1

|  | Surface Resistivity (ohm/sq) | Contact Angle | Young's Modulus (MPa) |
|---|---|---|---|
| Comparative Example 1 | $2.6 \times 10^{10}$ | 72° | 3,500 |
| Example I | $3.4 \times 10^{10}$ | 100° | 3,400 |

With the amount of carbon black illustrated in Table 1 incorporated, both the Comparative Example 1 polyimide ITB and the Example I fluoropolyimide ITB exhibited suitable resistivity, thus were functional as ITB devices.

Contact Angle Measurement

The contact angles of water (in deionized water) of the ITB devices of Comparative Example 1 and Example I were measured at ambient temperature (about 23° C.), using the Contact Angle System OCA (Dataphysics Instruments GmbH, model OCA15). At least ten measurements were performed, and their averages are also reported in Table 1.

The disclosed ITB device comprising a fluoropolyimide (Example I) was much more hydrophobic (about 30 degrees higher contact angle) than the Comparative Example 1 polyimide ITB device.

It is believed that the low surface energy fluoropolyimide ITB disclosed in Example 1 would exhibit improved toner transfer and excellent cleaning efficiency when compared with the polyimide ITB.

Young's Modulus Measurement

The above ITB members or devices of Comparative Example 1 and Example I were measured for Young's modulus following the ASTM D882-97 process. The sample (0.5 inch×12 inch) was placed in the measurement apparatus, the Instron Tensile Tester, and then elongated at a constant pull rate until breaking. During this time, the instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test specimen.

The Young's modulus of the Example I fluoropolyimide ITB device was measured to be about 3,400 MPa (Mega Pascal), and thus exhibited excellent mechanical strength versus fair mechanical strength of about 3,000 MPa (Mega Pascal) for the Comparative Example 1 member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a polyimide substrate first layer, and thereover a fluoropolyimide second layer wherein said member has a water contact angle of from about 80 degrees to about 145 degrees, and wherein said fluoropolyimide is represented by one of the following

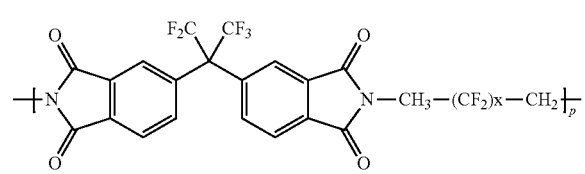

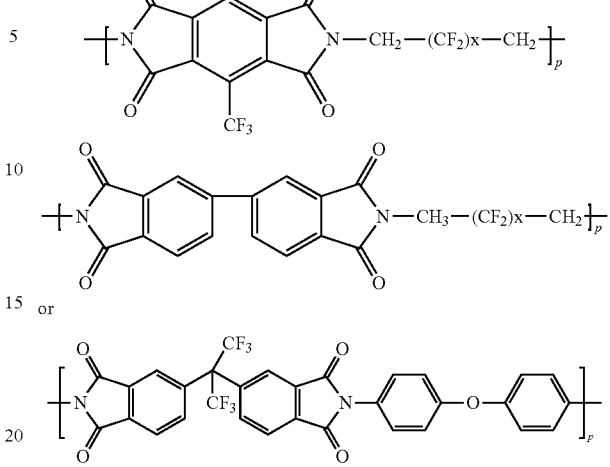

or wherein x is a number of from about 1 to about 100 and p represents the number of repeating units ranging from about 10 to about 1,000.

2. An intermediate transfer member in accordance with claim 1 wherein said fluoropolyimide is represented by

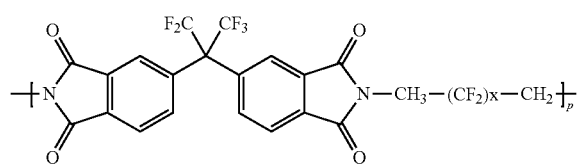

3. An intermediate transfer member in accordance with claim 1 wherein said fluoropolyimide is represented by one of the following

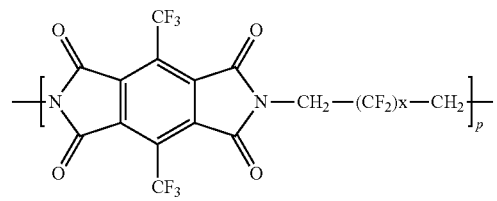

4. An intermediate transfer member in accordance with claim 1 wherein said fluoropolyimide is represented by the following

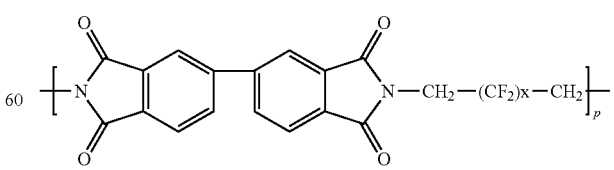

5. An intermediate transfer member in accordance with claim 1 wherein said fluoropolyimide is represented by the following

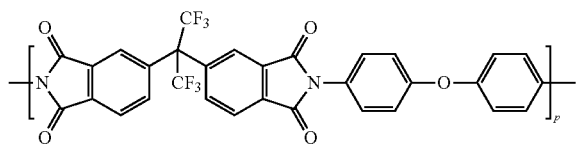

6. An intermediate transfer member in accordance with claim 1 wherein x is a number of from about 2 to about 50 and p is the number of repeating units of from about 20 to about 500.

7. An intermediate transfer member in accordance with claim 1 wherein said fluoropolyimide is represented by the following

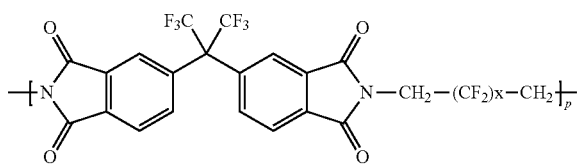

wherein p is 500.

8. An intermediate transfer member in accordance with claim 1 wherein said fluoropolyimide possesses a weight average molecular weight of from about 2,000 to about 500,000.

9. An intermediate transfer member in accordance with claim 1 wherein said polyimide is at least one of a polyimide, a polyetherimide, a polyamideimide, or mixtures thereof.

10. An intermediate transfer member in accordance with claim 1 wherein said member is a weldable belt.

11. An intermediate transfer member in accordance with claim 1 wherein said member has a surface resistivity of from about $10^8$ to about $10^{13}$ ohm/sq.

12. An intermediate transfer member in accordance with claim 11 wherein said surface resistivity is from about $10^9$ to about $10^{12}$ ohm/sq.

13. An intermediate transfer member in accordance with claim 1 with a water contact are of from about 90 degrees to about 130 degrees.

* * * * *